S. S. CONANT.
WHEEL.
APPLICATION FILED JULY 6, 1915.
1,160,140.
Patented Nov. 16, 1915.
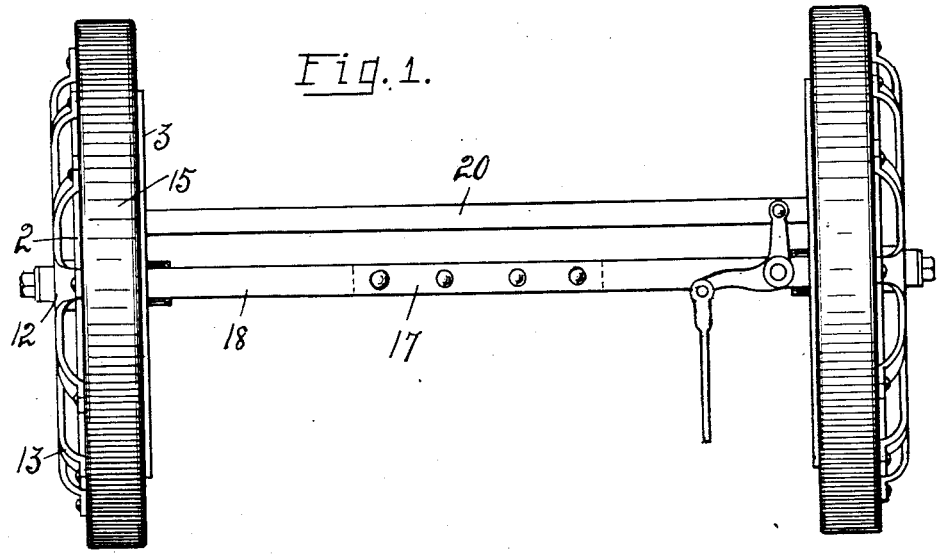
Fig. 1.
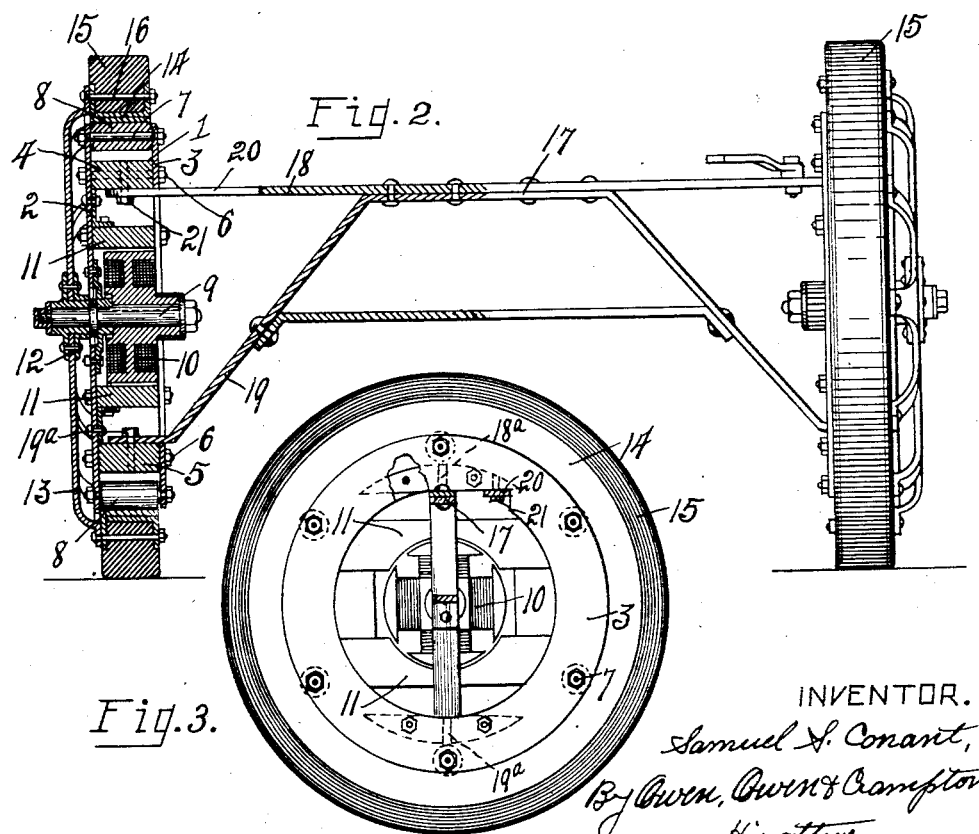
Fig. 2.
Fig. 3.
INVENTOR.
Samuel S. Conant,
By Owen, Owen & Crampton
His attys.

UNITED STATES PATENT OFFICE.

SAMUEL S. CONANT, OF TOLEDO, OHIO.

WHEEL.

1,160,140.    Specification of Letters Patent.    Patented Nov. 16, 1915.

Application filed July 6, 1915. Serial No. 38,289.

*To all whom it may concern:*

Be it known that I, SAMUEL S. CONANT, a citizen of the United States, and a resident of Toledo, in the county of Lucas and State of Ohio, have invented a certain new and useful Wheel; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to drive means for vehicle wheels and particularly to the steering wheels of vehicles.

The object of my invention is the provision of an improved wheel which is provided with individual driving means inclosed within itself whereby the geared connection between the customary drive means and the wheels of a vehicle is obviated.

The invention is fully described in the following specification, and while, in its broader aspect, it is capable of embodiment in numerous forms, a preferred embodiment thereof is illustrated in the accompanying drawings, in which—

Figure 1 is a top plan view of two oppositely disposed steering wheels of a vehicle connected together and provided with my invention. Fig. 2 is an elevation thereof with one wheel and a portion of a connecting axle structure in central vertical section, and Fig. 3 is an inner side view of one of the wheels with the axle structure and steering rod in section.

Referring to the drawings, 1 designates the central stationary housing member of which 2 is the outer side and 3 the inner side. The sides 2 and 3 are spaced apart by upper and lower spacing blocks 4 and 5, respectively, which blocks are secured to the housing sides, in the present instance, by bolts 6. The outer edge portions of the housing sides 2, 3 are connected by a plurality of equidistantly spaced bolts 7 on each of which is mounted an antifriction roller 8. The outer side 2 is centrally journaled on a shaft 9 on which the armature 10 of an electric motor is mounted, said motor being disposed within the housing 1 and having the field members 11, which are fixedly secured within the housing in encircling relation to the armature 10. The inner side 3 of the housing is of ring form to provide a central opening to the interior of the housing, said opening being preferably larger than the motor to permit free access thereto.

The end of the motor shaft 9, which is disposed without the housing side 2, has what may be termed a spider 12 fixed thereto, the spokes 13 of which radiate from the shaft 9 and have their outer ends turned inward over the outer side edge of the housing and fixed to a rim 14, which rim rests on the rollers 8 for free rotation relative to the housing 1. The rim 14 is shown, in the present instance, as comprising two members which are L-shape in cross-section and lapped one over the other with their radially disposed flanges spaced and coöperating to form a channel for holding a tire 15 of rubber or other suitable material. The members of the rim 14 are drawn together against the opposing sides of the tire 15 by bolts 16, which bolts pass through the tire and also serve to secure the spokes 13 of the spider to the rim. It is thus evident that a rotating of the shaft 9 will drive the spider 12 and cause a rotation of the rim 14 and tire 15 around the housing 1.

17 designates an axle structure, which is provided at each end with a pair of vertically spaced arms 18 and 19, which project within the opening of the housing with the upper arm 18 disposed above the shaft 9 and pivoted centrally to the block 4 for horizontal turning movements, as at 18$^a$, Fig. 3, and with the lower arm 19 entering the housing below the shaft 9 and pivoted to the block 5, as at 19$^a$. The axes of the pivots 18$^a$ and 19$^a$ register in a vertical line, which cuts the axis of the wheel midway between the sides of the housing and also midway between the side edges of the tread or tire portion 15 so that the radial thrust of the tire is in the plane of said pivots.

The wheels are coupled together at one side of the axle structure 17 by a coupling rod or bar 20, which is pivoted at its ends to the respective housing blocks 4, as at 21, whereby a longitudinal movement of the bar 20 relative to the axle structure 17 will impart corresponding horizontal turning or steering movements to the connected wheels, as is apparent. The bar 20 may be connected to the steering mechanism in any suitable manner, as is well understood in the art.

It is evident that I have provided a wheel structure in which the individual driving motor for the wheel is mounted in a non-rotating housing and that the rim portion only of the wheel has turning movements about the housing, said rim portion being mounted on the housing for free rotary movements thereon and having connection at the side of the housing with the motor shaft, thus providing a simple and efficient wheel construction.

I wish it understood that my invention is not limited to any specific construction, arrangement or form of the parts except in so far as such limitations are specified in the claims.

Having thus described my invention, what I claim as new, and desire to secure by Letters Patent, is,—

1. A wheel having a non-rotative central housing, a shaft rotatably carried by said housing centrally thereof, antifriction rollers arranged in circular series around the peripheral portion of the housing, a wheel rim mounted on said rollers for free rotation around the housing, connection between a side of said rim and said shaft at one side of the housing, and a motor disposed within the housing and connected to said shaft for driving the same.

2. A wheel having a non-rotative housing, the inner side of which is open, a shaft journaled transversely in said housing centrally thereof, a motor mounted within the housing and connected to said shaft for driving the same, antifriction rollers carried by said housing in circular series around the peripheral portion thereof, a rim encircling said housing and rotatably mounted on said rollers, means fixedly connecting the outer side of the rim to said shaft at the outer side of the housing, and an axle structure having a forked end projecting into the open side of said housing with the furcations thereof pivoted to the housing interiorly thereof for horizontal turning movements relative to the housing.

3. A wheel comprising a circular housing having its inner side open, a motor mounted within the housing and having its shaft disposed in axial relation to the housing and freely rotatable relative thereto, a rim rotatably encircling said housing, anti-friction means carried by the housing and forming a support for the rim, driving connection between said motor shaft and the rim at the outer side of the housing, and an axle structure projected into said housing and pivoted interiorly thereof midway between its sides for horizontal turning movements relative thereto.

4. A wheel comprising a circular housing having its inner side open, a motor mounted within the housing and having its shaft disposed in axial relation to the housing and freely rotatable relative thereto, a rim rotatably encircling said housing, anti-friction means carried by the housing and forming a support for the rim, driving connection between said motor shaft and the rim at the outer side of the housing, an axle structure projected into said housing and pivoted interiorly thereof midway between its sides for horizontal turning movements relative thereto, and a bar disposed at one side of said axle structure and pivoted at one end to said housing whereby a longitudinal movement of the bar relative to the axle structure will impart horizontal turning or steering movements to the wheel.

In testimony whereof I have hereunto signed my name to this specification.

SAMUEL S. CONANT.